United States Patent [19]

Pecherer et al.

[11] Patent Number: 5,405,713
[45] Date of Patent: Apr. 11, 1995

[54] REFUELING SYSTEM

[75] Inventors: Eugeni Pecherer, Netanya; Joseph Biran, Raanana; Jonathan Goldstein, Jerusalem, all of Israel

[73] Assignee: Electric Fuel (E.F.L.) Ltd., Jerusalem, Israel

[21] Appl. No.: 122,788

[22] Filed: Sep. 15, 1993

[30] Foreign Application Priority Data

Sep. 15, 1992 [EP] European Pat. Off. ............ 92308404

[51] Int. Cl.[6] .............................................. H01M 6/52
[52] U.S. Cl. ......................................... 429/49; 29/730; 429/27; 205/64
[58] Field of Search ............... 429/27, 49, 70; 29/730, 29/731; 205/64

[56] References Cited

U.S. PATENT DOCUMENTS

| 2,380,329 | 7/1945 | Price | 429/49 X |
|---|---|---|---|
| 3,368,925 | 2/1968 | Denison et al | |
| 3,513,031 | 5/1970 | Zaromb | |
| 3,554,810 | 1/1971 | Zaromb | |
| 3,830,662 | 8/1974 | Kinsey | |
| 4,005,061 | 1/1977 | Lemaire | 423/102 |
| 4,081,693 | 3/1978 | Stone | 307/66 |
| 4,745,038 | 5/1988 | Brown | 429/27 |
| 5,071,444 | 12/1991 | Gaydos | 429/49 X |
| 5,228,958 | 7/1993 | Goldstein et al. | 429/49 X |

FOREIGN PATENT DOCUMENTS

| 0047792 | 3/1982 | European Pat. Off. . |
|---|---|---|
| 0075979 | 4/1983 | European Pat. Off. . |
| 1573040 | 4/1969 | France . |
| 2075986 | 10/1971 | France . |
| 1296610 | 11/1972 | United Kingdom . |
| 9203869 | 3/1992 | WIPO . |

*Primary Examiner*—Stephen Kalafut
*Attorney, Agent, or Firm*—Helfgott & Karas

[57] ABSTRACT

The invention provides a refueling system for automated recharging of zinc-air batteries of the type having a plurality of active zinc anode elements formed of active zinc material attached to a support frame immersed in an aqueous alkaline electrolyte in a battery casing, each anode element being in alternate array with an air cathode, the system comprising automated means for simultaneously separating a plurality of spent anodes from the casing, means for removing used electrolyte from the casing, transport means for conveying spent anodes to an anode processing station, the anode processing station, at which zinc which has been at least partly oxidized is removed from the support frame, means for attaching new or reconstituted active zinc material to a cleaned support frame to form an active zinc anode, automated means for simultaneously introducing a plurality of active zinc anodes into the casing, and means for introducing fresh electrolyte into the casing.

9 Claims, 7 Drawing Sheets

REFUELING SYSTEM

The present invention relates to a refueling system for electrically powered vehicles. More particularly the present invention relates to a refueling system for automated recharging of zinc-air batteries.

Various proposals have been made in the past for electrically powered vehicles. To date, for a number of reasons, electric vehicle systems have yet to become commercially viable generally for urban highway applications. There have been proposals to employ zinc-air batteries for urban vehicle propulsion. An example is the following publication: Improved slurry zinc-air systems as batteries for urban vehicle propulsion, by P. C. Foller, Journal of Applied Electrochemistry 16(1986), 527-543.

"Machine Design" of Sep. 21, 1989 carried a review of electric batteries and vehicles and found that delivery vans were likely to be the first commercially produced electrically driven vehicles.

The Bedford CF electric van, using a lead-acid battery, is in production in the United Kingdom. It has a 50-60 mile range and a top speed of 50 mph, as reported by the Standard Handbook for Electrical Engineers.

Metal-air battery structures are described in the following publications: U.S. Pat. No. 4,842,963, entitled Zinc Electrode and Rechargeable Zinc-Air Battery; U.S. Pat. No. 4,147,839, entitled Electrochemical Cell with Stirred Slurry; U.S. Pat. No. 4,908,281, entitled Metal-air Battery with Recirculating Electrolyte; U.S. Pat. No. 3,847,671, entitled Hydraulically Refuelable Metal-Gas Depolarized Battery System; U.S. Pat. No. 4,925,744, entitled Primary Aluminum-Air Battery; U.S. Pat. No. 3,716,413, entitled Rechargeable Electrochemical Power Supply. In U.S. Pat. No. 3,592,698, entitled Metal Fuel Battery with Fuel Suspended in Electrolyte, there is described inter alia a method for circulating an electrolyte/metal fuel powder mixture through the battery; U.S. Pat. No. 4,126,733, entitled Electrochemical Generator Comprising an Electrode in the Form of a Suspension, relates to a similar subject using a circulated suspension of inert cores coated with an electrochemically active material. In U.S. Pat. No. 4,341,847, entitled Electrochemical Zinc-Oxygen Cell, there is described a method in which an electrolyte is circulated in the annular space between concentric electrodes.

Electrical energy storage systems are described in the following publications: U.S. Pat. No. 4,843,251 entitled Energy Storage and Supply; Energy on Call by John A. Casazza et al, IEEE Spectrum Jun., 1975, pp 44-47; U.S. Pat. No. 4,275,310, entitled Peak Power Generation; U.S. Pat. No. 4,124,805, entitled Pollution-Free Power Generating and Peak Power Load Shaving System; U.S. Pat. No. 4,797,566, entitled Energy Storing Apparatus.

Regeneration of spent zinc-containing alkaline electrolyte is described in a number of prior patents. For example, in U.S. Pat. No. 3,847,671 (mentioned above) whole spent electrolyte is subjected to electrolysis, when zinc deposited at the cathode is removed with a wiper blade. The thus-removed zinc is said to be substantially heavier than the electrolyte (35-40% KOH) and thus falls to the bottom of each cell. In U.S. Pat. No. 3,981,747, it is proposed to regenerate the spent zinc in an alkaline electrolyte reaction with a strongly electronegative metal, such as magnesium or aluminum, which displaces the zinc. In U.S. Pat. No. 4,341,847 (also mentioned above), spent zinc in the alkaline electrolyte is regenerated either by reversing the current and plating zinc on the anode, or by merely mechanically replacing zinc oxide particles by active zinc particles as described, e.g., in Israel Specification 10093, the teachings of which are incorporated herein by reference.

Metal-air and particularly zinc-air battery systems are known in the art and, due to their high energy densities, relative safety of operation and the possibility of ready mechanical recharging, such systems have been suggested as a power source for electrically propelled automotive vehicles. To date, for various reasons, such systems have yet to meet with significant commercial success.

For use in vehicle propulsion, it is highly desirable that a battery have a high specific energy, relative to its own weight. Lead-acid batteries produce only 30-40 Wh/kg, and even the high-temperature sodium-sulfur type is rated at only 100 Wh/kg. Herein lies a central advantage of the zinc-air battery, which is rated at 150-250 Wh/kg, higher than any other rechargeable battery available.

One of the principal drawbacks of battery systems as a power source for automotive vehicle propulsion, and particularly zinc-air battery systems, resides in the difficulty in achieving the combination of both a high continuous current drain, such as is needed for extended uphill driving, and short term high peak power output such as is needed for quick acceleration, while at the same time maintaining a high energy density and facilitating rapid rechargeability.

On the one hand, in order to achieve high continuous current drain a large reservoir of active anode material is needed. Due to space and other considerations this is generally best achieved by incorporation of a highly porous active anode element having large-surface active anodic material.

By contrast, in order to achieve high peak power output, i.e. the ability to provide a very high level of power for a short burst of time, studies have found that a tight interparticulate structure of the active anodic material is advantageous. This results in a low porosity with known powdered anodes and can drastically reduce the current capacity of the battery.

To date, in known-in-the-art battery systems much emphasis has been placed on achieving high capacity. Zinc anodes in various battery systems are generally formed in one of two broad families of processes: According to one family, particularly applicable to primary alkaline batteries, the anodes are constructed from finely powdered zinc typically produced by a thermal atomization process. The resultant zinc powder typically has a particulate-size distribution of between 0.0075 to 0.8 mm and a surface area of between 0.2-0.4 $m^2/g$; it is generally combined with mercury, sodium carboxymethyl cellulose and KOH solution to form a gelled mass readily extruded into an anode form. Alternatively the powdered zinc may be sintered, or wetted with mercury and pressed into a plate. Porosity of the anode may be controlled by use of removeable pore forming materials such as $NH_4Cl$. The density of the zinc anode material precursor used in such methods is typically within the range of 2.5-3.5 gr/cc.

According to the second family of processes, exemplified by an anode proposed by Ross, U.S. Pat. No. 4,842,963, claimed to be particularly suitable for electrically rechargeable zinc-air batteries, the electrode is prepared by electrolytically depositing zinc on the internal surface of the foam electrode support to form a zinc electrode. Said patent however claims an improved zinc electrode for a rechargeable zinc-air battery comprising an outer frame, a porous foam electrode support within said frame having zinc deposited thereon and treated prior to the deposition of zinc thereon to inhibit the formation of zinc dendrites on the external surface thereof, and means within said outer frame for circulating an alkaline electrolyte through the interior of said treated zinc-coated porous foam, and a battery system which requires the inclusion of circulation means for a circulating alkaline electrolyte through the interior thereof is not practical or desirable.

At typical current densities it has been found that zinc-air batteries in which the anodes are constructed according to the above methods fail to provide a combination of rapid rechargeability, high current capacity and high peak power output. Hence it would be desirable to provide an anode capable of providing a battery with all of these attributes, i.e. high current density, rapid rechargeability, high current capacity and high peak power output.

In an effort to further increase the advantages of using zinc-air battery systems for electro-automotive propulsion, it has now been proposed in a copending application to employ a mechanically rechargeable battery system comprising a rigid anode designed to be rapidly removed and replaced on a periodic basis at dedicated service stations specifically equipped for the purpose. The spent anodic material, which after use has been oxidized, may then be recycled external to the battery for later reuse in other batteries. To facilitate recycling of the active anodic material, it is necessary to separate the spent anodic material from the other anode components.

In Israel Specification 100903 there is described and claimed an improved zinc battery anode, particularly for zinc-air batteries, featuring a substantially planar skeletal frame comprising conductive metal having a portion of its surface area formed as open spaces, and an active zinc anode element encompassing the skeletal frame, and said active anode element formed of a slurry of porous granules comprising zinc, impregnated with and suspended in an electrolyte, compacted under pressure onto the skeletal frame.

Said specification however does not teach or suggest a method for automated recharging of the such anodes.

With this state of the art in mind there is now provided according to the present invention a refueling system for automated recharging of zinc-air batteries of the type having a plurality of active zinc anode elements formed of active zinc material attached to a support frame immersed in an aqueous alkaline electrolyte in a battery casing, each anode element being in alternate array with an air cathode, said system comprising:
  a) automated means for simultaneously separating a plurality of spent anodes from said casing;
  b) means for removing used electrolyte from said casing;
  c) transport means for conveying spent anodes to an anode processing station
  d) said anode processing station, at which at least partially oxidized zinc is removed from said support frame;
  e) means for attaching new or reconstituted active zinc material to a cleaned support frame to form an active zinc anode;
  f) automated means for simultaneously introducing a plurality of active zinc anodes into said casing; and
  g) means for introducing fresh electrolyte into said casing.

Figure 12:
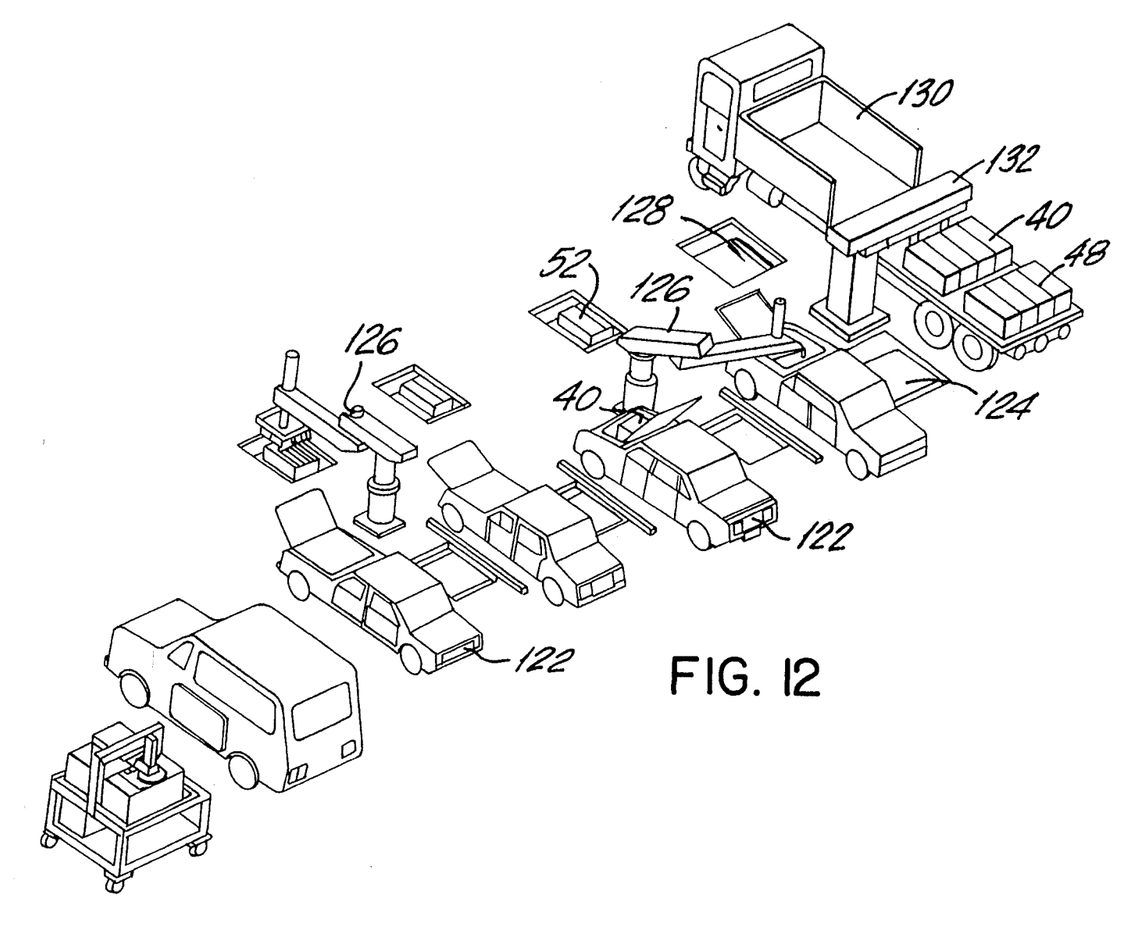
FIG. 12 is a pictorial view of a refueling station for electric vehicles.

While the following description refers mainly to a refueling and regeneration station such as is shown in FIG. 12, wherein a spent battery is removed from the vehicle and replaced with a new or newly recharged battery, many of the components described would be suitable for use in a system where the battery is recharged without removal from the vehicle. The former system is appropriate to a situation where said refueling station must quickly service incoming vehicles which are to be driven immediately, while the latter system is appropriate for servicing for example delivery vans which are operated by day only and are recharged during the night.

It will also be apparent that refueling and regeneration need not necessarily be carried out at the same site. For example, a single central regeneration station may well serve a plurality of refueling stations. The latter will service electric vehicles each in its own area, and transfer spent batteries (or spent battery anodes) in bulk to the former in exchange for regenerated batteries (or regenerated anodes). Thereby the regeneration station will be able to make use of its automated equipment, while each refueling station requires only the simple equipment needed to remove and replace batteries (or anodes) in vehicles.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
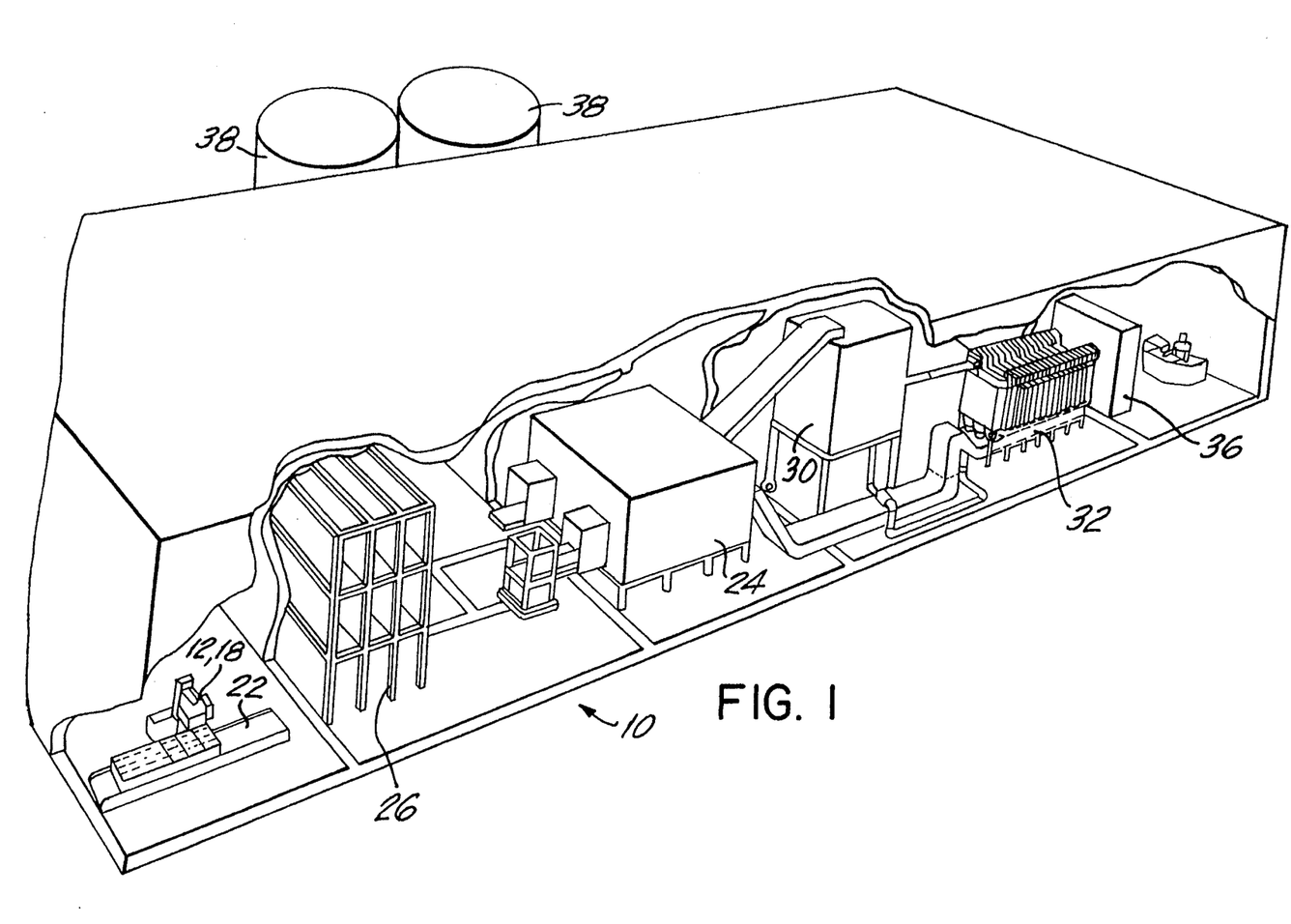
FIG. 1 shows a perspective view of a preferred embodiment of the recharging system according to the invention.

There are seen in FIG. 1 most of the components of a refueling system for automated recharging of zinc-air batteries of the type having a plurality of active zinc anode elements formed of active zinc material attached to a support frame immersed in an aqueous alkaline electrolyte in a battery casing, each anode element being in alternative array with an air cathode. These batteries have been described in our co-pending application filed today.

The system 10 includes automated means 12 for simultaneously separating a plurality of spent anodes 14s from the battery casing 16 which means 12 will be described in detail with reference to FIGS. 2 & 3.

Associated with means 12 are means 18 for removing used electrolyte 20 from the casing 16; this will be described with reference to FIGS. 4 & 5.

Also seen are transport means 22 for conveying spent anodes 14 to an anode processing station 24. The drawing shows an intermediate storage station 26 which is used to achieve an even flow of spent anodes 14s to the processing station 24, which will be described with reference to FIGS. 7 & 8. At the station 24, zinc which has been at least partly oxidized is removed from the anode support frame 28.

Also seen is a dissolution tank 30 and electrowinning baths 32 which will be described with reference to FIG. 6.

Figure 9:
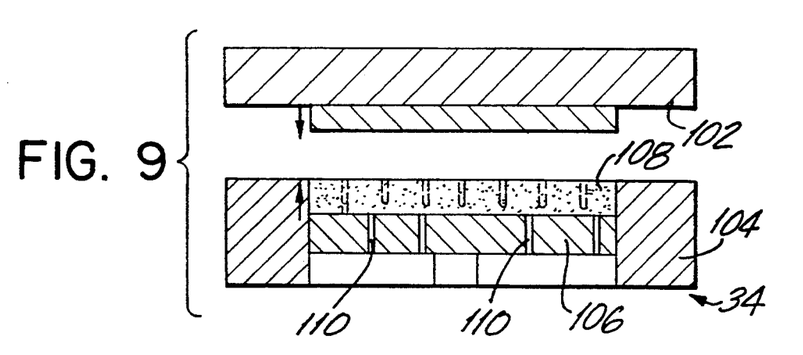
FIG. 9 is a cross-sectional elevation of the upper and lower platen of a compaction press for anodes.
Figure 10:
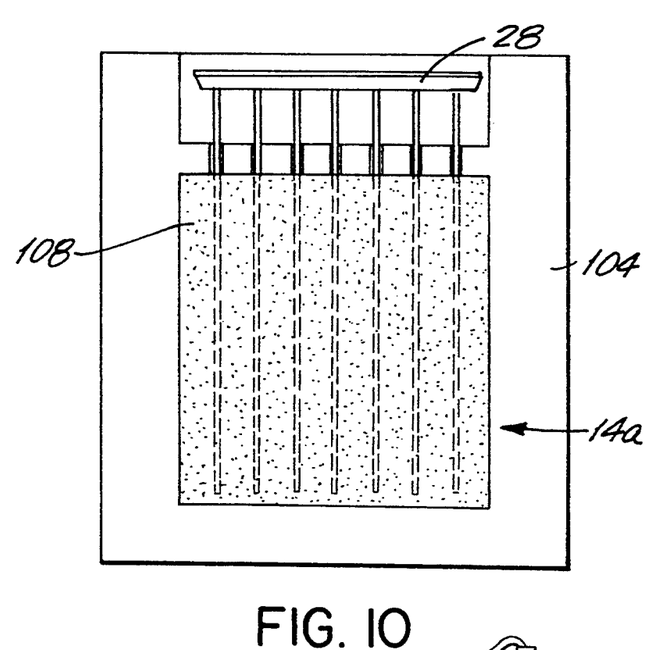
FIG. 10 is a plan view of the lower platen of said press.

The system 10 also includes means 34 for attaching new or reconstituted active zinc material to a cleaned support frame 28 to form an active zinc anode which means 34 are seen in FIGS. 9 & 10.

Shown in FIG. 1 is a power conversion and control unit 36, and buffer tanks 38 for the storage of electrolyte or electric fuel.

The system 10 further includes automated means for simultaneously introducing a plurality of active zinc anodes into the battery casing. For this purpose means 12, described with reference to FIGS. 2 & 3 may be used. It will therefore be advantageous to use at least two such devices, one for disassembly and one for assembly. Similarly, means 18 for removing spent electrolyte 20 may also comprise the means for introducing fresh electrolyte 20 into the battery casing 16. Again, it will be convenient to use separate units for removal and filling.

Figure 2:
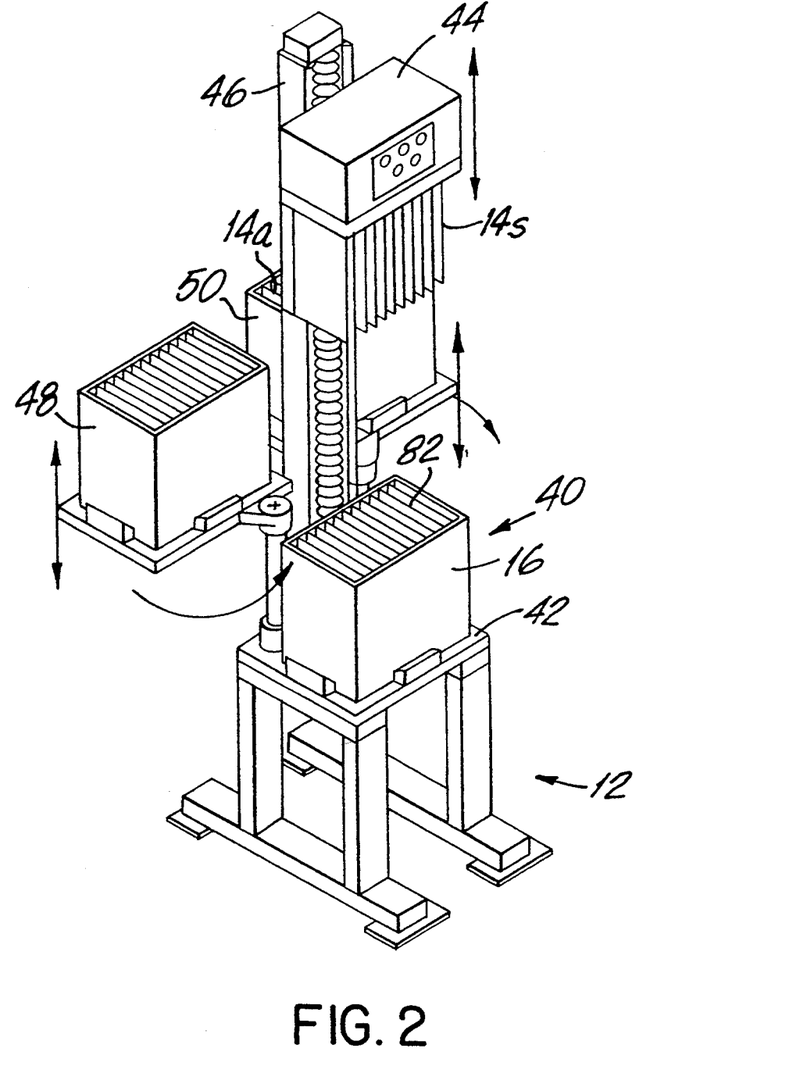
FIG. 2 is a perspective view of a machine for the removal and replacement of anodes in a battery case.

FIG. 2 shows automated means 12 for simultaneously separating a plurality of spent anodes 14s from a battery casing 16. The same device may be arranged to operate for the reverse purpose as automated means for simultaneously introducing a plurality of active zinc anodes 14a into the casing 16.

The battery 40 being refueled is clamped to a horizontal table 42 after having previously had its upper cover removed. A multi-anode clamping device 44, which will be described with reference to FIG. 3, is slidably mounted on a column 46 and may be driven either up or down thereon; it is shown in its upper position holding a set of spent anodes 14s which it has lifted out of the casing 16.

A container 48 for spent anodes 14s is shown at an intermediate height, below the spent anodes 14s which are held in the device 44. The container 48 can be swung into alignment under the device 44 to receive spent anodes 14s therefrom. A second container 50 holding active anodes 14a may alternatively be swung under the device 44, which is arranged to grip and lift out the anodes 14a. After the container 50 has been swung back to clear a path for the device 44, the new anodes 14a are lowered into the battery being refueled 40.

Figure 3:
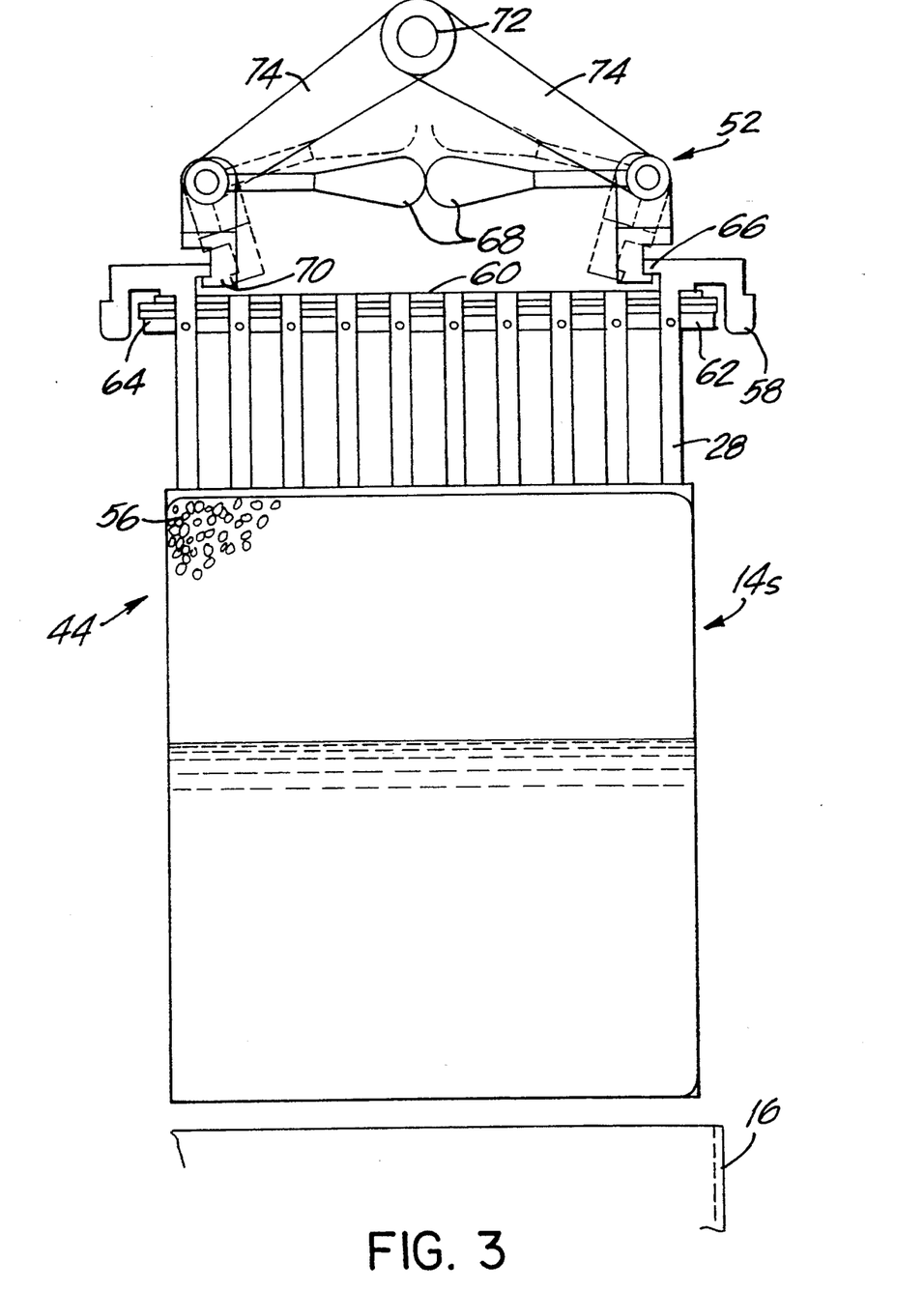
FIG. 3 is a front elevation in detail of the machine of FIG. 2, showing anode clamping means.

FIG. 3 shows a detail of the clamping device 44, and also parts of the battery being processed.

The device 44 forms the means for separating a plurality of spent anodes 14s from the battery casing 16; it comprises a mechanism 52 which simultaneously grips a plurality of spent anodes 14s and lifts them out of the casing 16.

The battery parts shown are the anode support and collector frame 28, the porous zinc sheet 56, male contacting elements 58, upper horizontal conducting bar 60, and a lower elastomeric gasket 62 mounted on a plastic support 64.

In order to remove spent anodes 14s from the casing 16, the mechanism 52 is brought down and swiveled into place, locking in under projecting lugs 66. A pair of weighted compression levers 68 cause hooks 70 to maintain contact with the lugs 66 as the mechanism 52 is raised by an eyelet 72 and lift tie levers 74. A plurality of clamping devices 44 operate simultaneously to service part or all of a battery.

Figure 4:
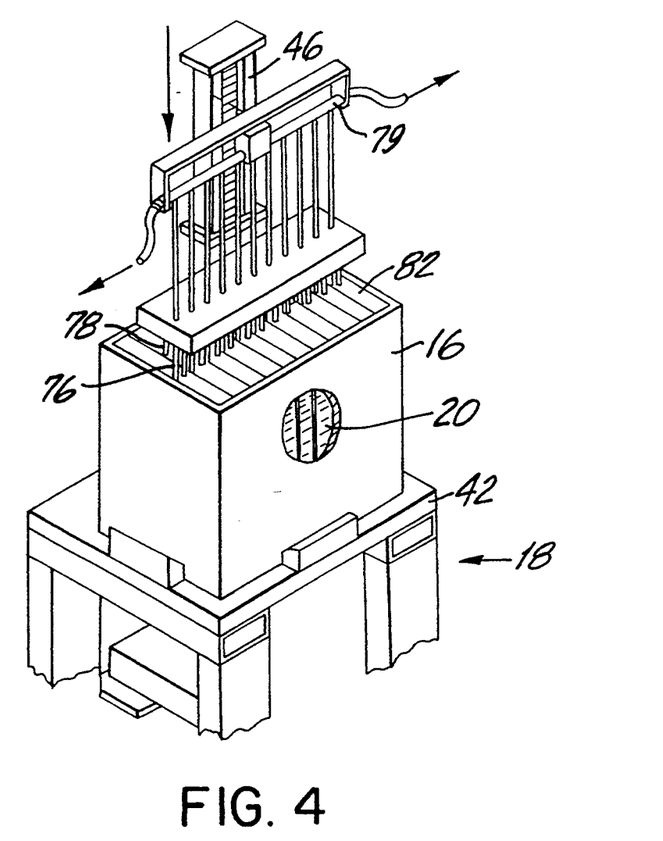
FIG. 4 is a perspective view of a device for removing and replacing electrolyte in a battery case, shown partially fragmented.

There is seen in FIG. 4 a device 18 for removing and replacing electrolyte 20, usually KOH, in the battery casing 16.

The device 18 includes a pump (not shown) provided with multiple inlet orifices 76 and outlet orifices 78, which are insertable each into a cell of the casing 16 after removal of spent anodes 14s therefrom. The electrolyte 20 passes through a manifold 79. The device 18, in addition to removal and replacement of electrolyte, may be used for topping up and for rinsing out any solid matter accumulating in the casing 16. The device 18 operates after being lowered down into a casing 16 and is raised on completion of the task being performed. While the device 18 shown in the drawing appears as an independent unit, it is advantageous to combine it with the automated means 12 shown in FIG. 2. Such an arrangement saves a transfer operation of the casing 16.

Figure 5:
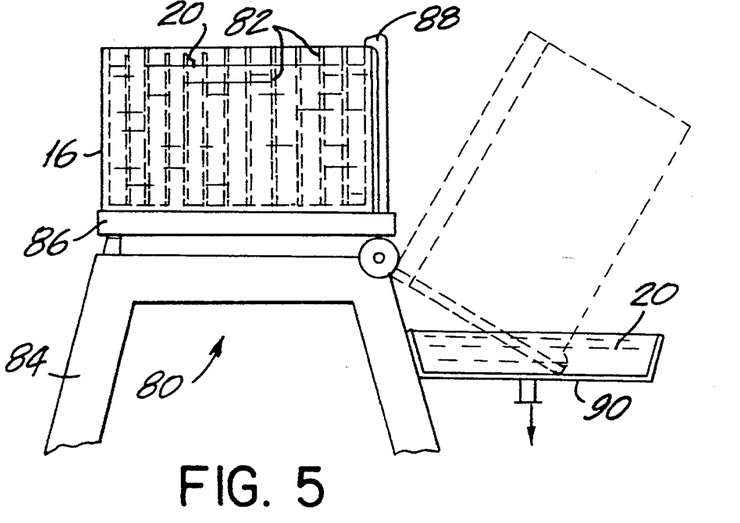
FIG. 5 is a side elevation of a device for removing electrolyte from same.

FIG. 5 shows a device 80 for removing used electrolyte 20 from a battery casing 16, which is here shown divided into cells 82.

The device 80 comprises a stand 84, a hinged platform 86 for tilting casing 16 and clamping means 88 for holding the casing 16. A drain tray 90 receives spent electrolyte 20 for renewal or disposal. At a station where it is required only to remove spent electrolyte 20, the device 80 is faster and cheaper than the device 18.

Figure 6:
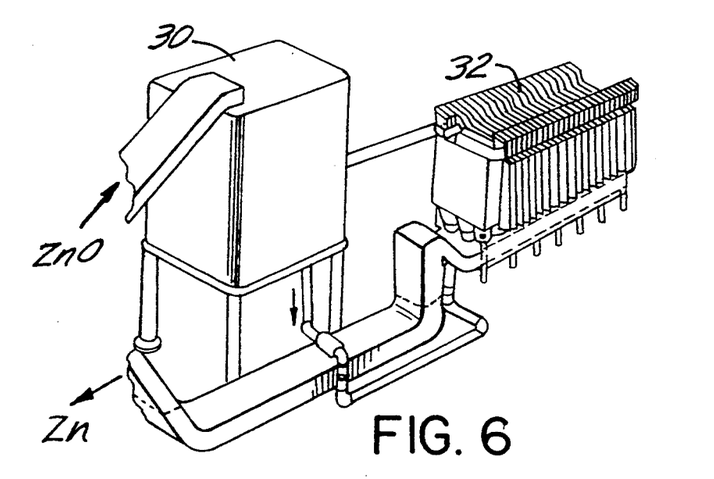
FIG. 6 is a perspective view of a two-step processing unit for converting zinc oxide to active zinc.

FIG. 6 shows a two-step anode processing unit for reconstituting oxidized zinc to produce active zinc.

Figure 7:
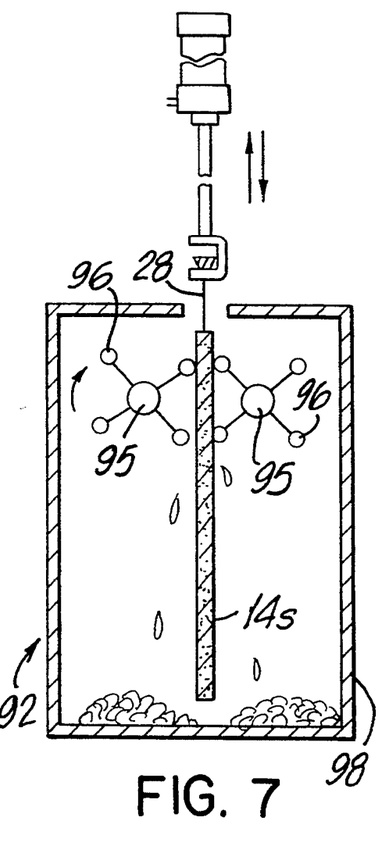
FIGS. 7 & 8 are two cross-sectional views of a machine for removal of zinc oxide from a conductive frame.
Figure 8:
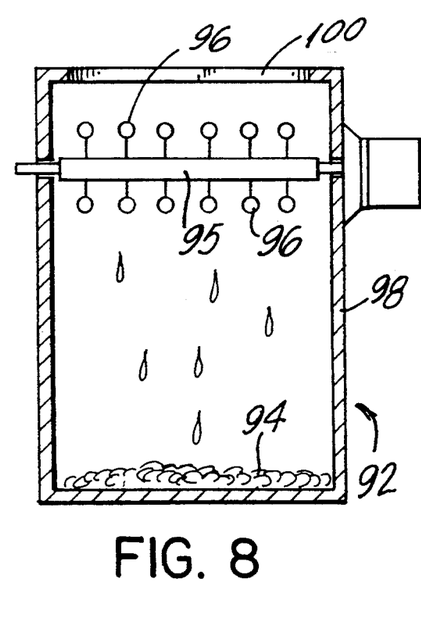

In a first stage, zinc oxide, which has been previously removed from spent anodes 14s by a device such as will be described with reference to FIGS. 7 & 8, is fed into a dissolution tank 30, where it is dissolved in excess KOH to produce a zincate solution. The zincate solution is subsequently transferred to an electrowinning bath 32 to produce particulate active zinc.

FIG. 7 shows a machine 92 for removal of zinc oxide 94 from the anode support frame 28. Zinc, which has been at least partly oxidized, is mechanically removed from the support frame 28 in the machine 92 which is provided with a plurality of axes 95, each provided with revolvably driven flexibly suspended bodies 96. The machine 92 is provided with means 97, for example a reciprocable air cylinder, to bring the support frame 28 into contact with the bodies 96, which act to delaminate the relatively brittle zinc oxide from the frame 28. As will be realised alternate means, such as grappling means (not shown) can be provided for pulverizing the discharged anode 94 material retained on said frame 28. A container 98 is provided with an upper guideslot 100 for insertion of a spent anode 14s. The discharge product, mainly ZnO with some residual metallic zinc and KOH, is collected in the container 98, and subsequently transferred to the dissolution tank 30. The anode support frame 28 is transferred for cleaning by a KOH rinse and soak operation.

FIG. 9 shows the upper and lower platens 102, 104 of a compaction press comprising means 34 for manufacturing active anodes 14a, and FIG. 10 shows the lower platen 104 of said press. Both platens can suitably be made of PVC, which is resistant to the KOH contained in the slurry 108.

A container 106 is configured to hold an anode support frame 28 which is immersed in a preweighed zinc slurry 108. The press is provided with means to apply a pressure of at least 20 kg/cm$^2$, preferably 30 kg/cm$^2$ over the surface of the slurry 108. The container 106 is provided with drain means 110 to allow escape of surplus KOH.

In operation, new or reconstituted active zinc material is attached to a cleaned support frame 28 to form an active zinc anode 14a comprising a rigid sheet of KOH-immpregnated porous zinc on the current collector. After removal from the press the anode 14a is inserted into a cleaned separator bag (not shown) and is ready for use in refueling. Zinc anodes or anode material may be transported or stored in a transport vessel, as described in co-pending U.S. patent application Ser. No. 08/122,718, filed Sep. 15, 1993, the teachings of which are incorporated herein by reference.

Figure 11:
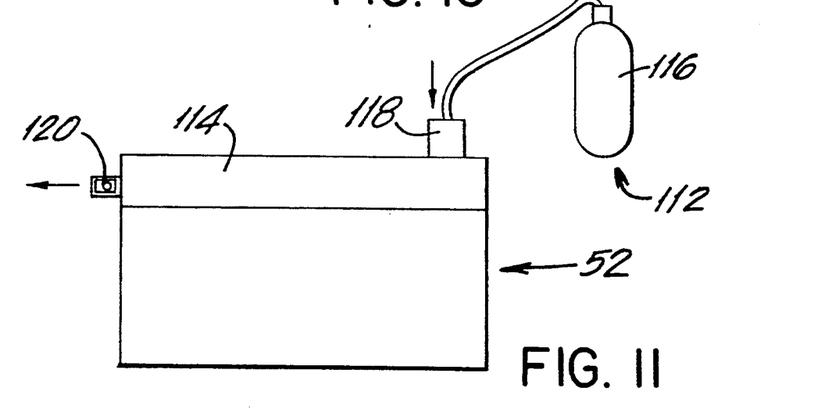
FIG. 11 is a diagramatic view of a device for inert gas flushing.

FIG. 11 shows a device 112 for inert gas flushing of containers for anodes or anode material. The container 52 is sealed by the attachment of a gas-tight cover 114, and air is removed and replaced by an inert gas such as nitrogen or argon. A source 116 of compressed inert gas is connected to one port 118 of the containers 52 while air is allowed to escape through a one-way valve 120 in a second port. The container is then available for transport or storage.

FIG. 12 shows a refueling station for electric vehicles 122. A first underground conveyor 124 accepts discharged batteries 40 which have been removed by robotic lifting devices 126 from vehicles 122. A second underground conveyor 128 carries recharged anodes in containers 52 and these are picked up by the devices 126 and positioned and lowered into the vehicles 122. A truck 130 is seen receiving containers 48 holding discharged anodes or discharged batteries 40 from the conveyor 124, by means of a further robotic device 132, for transfer to a recharging facility. Subsequently the truck 130 will collect recharged batteries 40 or containers 52 of fresh anodes from the recharging facility for supplying the conveyor 128.

It will be evident to those skilled in the art that the invention is net limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A refueling system for automated recharging of zinc-air batteries of the type having a plurality of active zinc anode elements each formed of active zinc material compactly pressed to a support frame immersed in an aqueous alkaline electrolyte in a battery casing, each anode element being in alternate array with an air cathode, said system comprising:
   a) automated means for simultaneously separating a plurality of spent zinc anode elements from said battery casing; the zinc in said spent zinc anode elements comprising zinc which has been at least partially oxidized;
   b) means for removing used electrolyte from said casing;
   c) transport means for conveying spent anodes to an anode processing station;
   d) said anode processing station, at which said zinc, which has been at least partly oxidized, is removed from said support frame;
   e) means for attaching new or reconstituted active zinc material to a cleaned support frame, comprising a press provided with a container configured to hold said frame immersed in a preweighed zinc slurry, said press being provided with means for applying a pressure of at least 20 kg/cm$^2$ over the surface of said slurry, to form an active zinc anode, having active zinc material compactly pressed to support frame;
   f) automated means for simultaneously introducing a plurality of active zinc anodes into said casing; and
   g) means for introducing fresh electrolyte into said casing.

2. The refueling system for automated recharging of zinc-air batteries as claimed in claim 1, wherein the means for separating a plurality of spent anodes from said casing comprises a mechanism which simultaneously grips a plurality of spent anodes and lifts them out of said casing.

3. The refueling system for automated recharging of zinc-air batteries as claimed in claim 1, wherein said means for removing used electrolyte comprises a pump provided with multiple inlet orifices, said orifices being insertable each into a cell of said casing after removal of said anodes therefrom.

4. The refueling system for automated recharging of zinc-air batteries as claimed in claim 1, wherein said means for removing used electrolyte comprises a device for tilting said casing and a drain tray for receiving said electrolyte for renewal or disposal.

5. The refueling system for automated recharging of zinc-air batteries as claimed in claim 1, wherein said anode processing station is further provided with means for reconstituting oxidized zinc to produce active zinc.

6. The refueling system for automated recharging of zinc-air batteries as claimed in claim 5, wherein zinc oxide previously removed from said anodes is dissolved in excess KOH to produce a zincate solution, and where said zincate solution is subsequently transferred to an electrowinning bath to produce particulate active zinc.

7. The refueling system for automated recharging of zinc-air batteries as claimed in claim 1, wherein zinc, which has been at least partly oxidized, is removed from said support frame in a machine provided with a plurality of revolvably driven flexibly suspended bodies, said machine being provided with means to bring said support frame into contact with said bodies.

8. The refueling system for automated recharging of zinc-air batteries as claimed in claim 1, wherein said container of said means for attaching new or reconstituted active zinc material is provided with drain means to allow escape of surplus KOH.

9. The refueling system for automated recharging of zinc-air batteries as claimed in claim 1, further provided with means for removal of air from the container and its replacement by an inert gas thereby preparing the container for transport or storage.

* * * * *